United States Patent [19]
Ogawa et al.

[11] Patent Number: 6,007,257
[45] Date of Patent: Dec. 28, 1999

[54] MULTIPLE-CORE OPTICAL CONNECTOR AND ITS MANUFACTURING METHOD

[75] Inventors: Takahiro Ogawa, Ichihara; Shinji Nagasawa, Mito, both of Japan

[73] Assignees: The Furukawa Electric Company Ltd.; Nippon Telegraph and Telephone Corporation, both of Tokyo, Japan

[21] Appl. No.: 08/909,970

[22] Filed: Aug. 12, 1997

[30] Foreign Application Priority Data

Dec. 13, 1995 [JP] Japan ..................................... 7-324440
Aug. 1, 1996 [JP] Japan ..................................... 8-203573

[51] Int. Cl.[6] ...................................................... G02B 6/36
[52] U.S. Cl. ................. 385/80; 385/78; 385/85
[58] Field of Search ................. 385/78, 80, 81, 385/83, 85

[56] References Cited

U.S. PATENT DOCUMENTS

| | | | |
|---|---|---|---|
| 4,341,439 | 7/1982 | Hodge | 385/59 |
| 5,422,971 | 6/1995 | Honjo et al. | 385/80 |
| 5,519,800 | 5/1996 | Ueda et al. | 385/80 |
| 5,712,939 | 1/1998 | Shahid | 385/78 |
| 5,867,620 | 2/1999 | Bunin et al. | 385/53 |

FOREIGN PATENT DOCUMENTS

| | | | |
|---|---|---|---|
| 0 535 636 A2 | 4/1993 | European Pat. Off. | G02B 6/25 |
| 5-229667 | 8/1983 | Japan | G02B 6/40 |
| 59-257259 | 12/1984 | Japan | G02B 6/40 |
| 62-191072 | 7/1987 | Japan | G02B 6/38 |
| 3-210510 | 1/1990 | Japan . | |
| 8-122572 | 10/1994 | Japan . | |
| 8-126951 | 10/1994 | Japan . | |

*Primary Examiner*—Hemang Sanghavi
*Attorney, Agent, or Firm*—Lacasse & Associates; Randy W. Lacasse; Wesley L. Strickland

[57] ABSTRACT

The invention relates to a multiple-core optical connector and its manufacturing method, wherein the end faces of optical fibers are made free from any damage. Optical fibers (12) are inserted into optical fiber insertion holes (2) of a ferrule (1) of a multiple-core connector, which is equipped with a plurality of optical fiber insertion holes (2) and made of plastic resin, and are fixed therein with an adhesive agent. Fitting pin holes (3) for axial alignment are constructed of a hole of a sleeve (5) made of a material, the hardness of which is higher than that of the plastic resin and optical fibers (12). If the connection end faces of the ferrule (1) for multiple-core optical connector are buffing-finished by using free abrasive grains, since the end face of the sleeve (5) having a higher hardness is less ground than the optical fibers (12), the end face of the sleeve (5) is formed to protrude from the connection end face of the optical fibers (12).

4 Claims, 3 Drawing Sheets

MULTIPLE-CORE OPTICAL CONNECTOR AND ITS MANUFACTURING METHOD

FIELD OF THE INVENTION

The present invention relates to a multiple-core optical connector in which a number of optical fibers are collectively attached to a ferrule for the multiple-core optical connector.

BACKGROUND OF THE INVENTION

FIGS. 4a and 4b illustrate a general manufacturing method of a so-called optical connector in which optical fibers are attached to a ferrule for optical connector. As shown in FIG. 4a optical fibers 12 of an optical fiber core line 10, the covering 11 of which is removed in advance, are inserted into an optical fiber insertion ports 22 attached to a ferrule for optical connector 21.

Next, the optical fibers 12 are fixed at the optical connector ferrule 21 by pouring an adhesive agent 7 through an adhesive agent supplying port 23 secured at the optical connector ferrule 21 in a state where the leading edges of optical fibers inserted as shown at (b) in the same drawing are caused to come out from the optical fiber inserting port 22 of the optical connector ferrule 21.

Thereafter, an optical connector 24 can be obtained by polishing (mirror-finishing) the end face which is in a state that the optical fibers 12 go through the end face.

In FIGS. 4a and 4b, number 25 is a fitting pin hole for axial alignment.

There are the following problems when polishing (mirror-finishing) the end face of the optical connector, from which the following shortcomings come out.

Usually, a ferrule 12 for optical connector is produced by mold-forming of plastic resin. If an optical fiber 12 made of, for example, quartz, is inserted into an optical connector ferrule 21 made of plastic resin and the end face thereof is polished (mirror-finished), the polishing quantity of the end of the optical fiber (12) having a high hardness degree is made less than the polishing quantity of the end face of the optical connector ferrule 21 made of plastic resin at a buffing stage in the final finishing process. Thereby, the end of the optical fiber 12 becomes protruded slightly from the end face of the optical connector ferrule 12.

With regards to optical connectors, one end of a fitting pin (not illustrated) is fitted to a fitting pin hole 25 for axial alignment of one optical connector and the other end of the fitting pin is fitted to a fitting pin hole 25 for axial alignment of the other optical connector, wherein one optical connector is placed with the other optical connector with their connection end faces come face to face after the axial alignment is secured between them.

In a case where optical connectors at which the end face of optical fiber 12 remains protruded from the end face of the optical connector ferrule 21 are connected to each other, the end faces of optical fibers 12 are brought into contact with each other whenever connection and disconnection are repeated to cause the end faces of the optical connectors 12 to be damaged, thereby causing the connection loss to be increased.

Therefore, a buffing step in the final finishing process is made difficult.

The present invention can solve the abovementioned themes, and it is therefore an object of the invention to provide a multiple-core optical connector and its manufacturing method, which are made free from any worry about a damage of the end faces of optical fibers.

DISCLOSURE OF THE INVENTION

In order to solve the abovementioned problems, the invention is provided with the a multiple-core optical connector; according to the invention a multiple-core optical connector is provided in which optical fibers are inserted into a plurality of optical fiber insertion holes of a ferrule for the multiple-core optical connector, made of plastic resin, consisting of a plurality of optical fiber insertion holes and fitting pin holes for axial alignment of said optical fiber insertion holes having an appointed interval from said plurality of optical fiber insertion holes, and is fixed with an adhesive agent, wherein said fitting pin holes for axial alignment are formed of a sleeve hole for a sleeve secured at the position where the fitting pin holes for axial alignment are formed of a ferrule for a multiple-core optical connector, the sleeve is constructed of plastic resin and a material having a higher hardness than the optical fibers, and the end face of said sleeve protrudes from the end face of the optical fiber at the connection end face of multiple-core optical connector.

Furthermore, said sleeve is characterized in that the same is constructed of ceramic or a super hard alloy.

Furthermore, a manufacturing method for the multiple-core connector according to the invention is characterized in comprising steps of preparing in advance a ferrule for the multiple-core optical connector having a plurality of optical fiber insertion holes, a sleeve, the hardness of which is higher than that of optical fibers, secured at the formed position of fitting pin for axial alignment, said optical fiber insertion holes and sleeve holes being opened at the end face for connection, and made of plastic resin, wherein said sleeve holes are made fitting pin holes for axial alignment, inserting optical fibers into the respective optical fiber insertion holes of the multiple-core optical connector and fixing the optical fibers in optical fiber insertion holes with an adhesive agent, thereafter carrying out a process for grinding the connection end face of a ferrule for multiple-core optical connector along with the end faces of optical fibers and sleeve, wherein the final finishing is performed by buffing with free abrasive grains, and causing said sleeve to protrude from the optical fibers at the connection end face of the ferrule for multiple-core optical connector by utilizing a feature that the buffing quantity of the sleeve, the hardness of which is higher than that of optical fibers and said plastic resin, is made less than the buffing quantity of said optical fibers and plastic resin.

With a multiple-core optical connector according to the invention, since a sleeve which forms a fitting pin hole for axial alignment is constructed of a material, the hardness of which is higher than that of plastic resin of a ferrule for multiple-core optical connector and that of a material for optical fiber, optical fibers are inserted into the ferrule for multiple-core optical connector, and the end face thereof is polished by buffing, using free abrasive grains in the finishing process, wherein the part of plastic resin is most abraded, the optical fibers are abraded next, and finally the sleeve is abraded. The end face of the sleeve is caused to protrude from the end face of optical fibers at the connection end face of multiple-core optical connectors.

In a case where multiple-core optical connectors are connected to each other by butting in the above mentioned state, the end faces of the sleeves which most protrude are butted to each other for the first time, and the end faces of optical fibers which have less protrusion than that of the sleeves are not directly brought into contact with each other. Therefore, even though the multiple-core optical connectors are repeatedly attached to or detached from each other, the end faces of the optical fibers are made free from any damage.

Furthermore, since matching oil having a refraction power corresponding to the core of optical fibers is filled between the connection end faces of multiple-core optical connector, no connection loss is produced even though the end faces of the optical fibers are not directly brought into contact to each other.

DETAILED DESCRIPTION

Figure 1A:
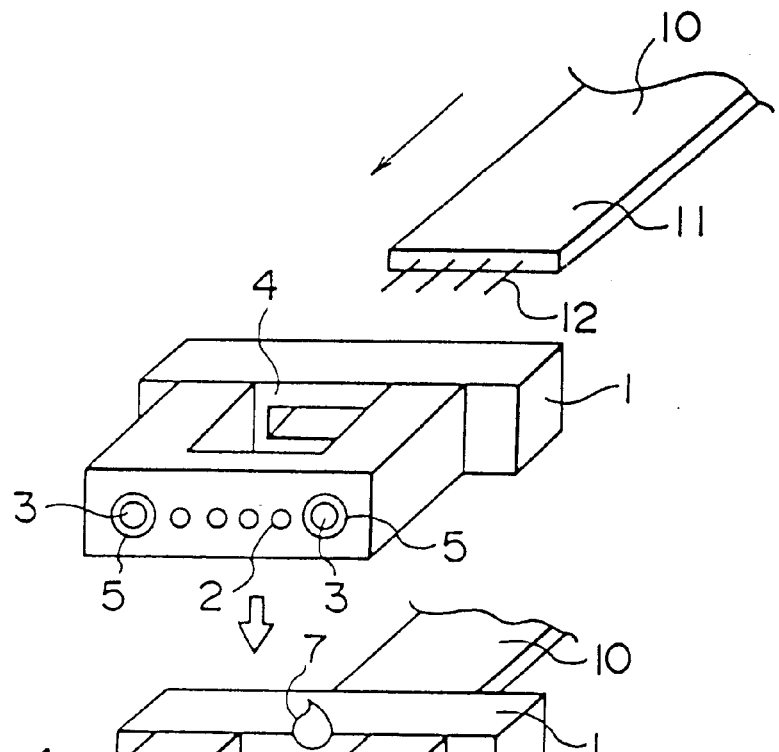
FIGS. 1a, 1b, and 1c are a perspective views showing a part of processes of one preferred embodiment of a method for manufacturing a multiple-core optical connector according to the invention.

A description will be given of a preferred embodiment of a multiple-core optical connector and its manufacturing method according to the invention.

FIG. 1 shows a manufacturing process of a multiple-core optical connector and according to the invention, 1 is a ferrule of multiple-core optical connector. The ferrule 1 for multiple-core optical connector is made of plastic resin and consists of optical fiber insertion holes 2, fitting pin holes 3 for axial alignment and an adhesive agent supplying port 4. However, the fitting pin hole 3 for axial alignment is such that the hole part thereof is constructed of a sleeve 5 made of ceramic, for example, zirconium, secured at a forming position of the hole 3.

Furthermore, the sleeve 5 is not limited to ceramic. That is, the same may be metal, for example, a super-hard alloy, etc., if the hardness thereof is higher than that of plastic resin and optical fibers 12.

A description is given of steps for forming a multiple-core optical connector 6 by fixing an optical fiber core line 10 to the ferrule 1 for multiple-core optical connector constructed as described above.

(1) As shown in FIG. 1(a), an optical fiber 12 of the optical fiber core line 10, the leading edge covering 11 of which is eliminated at an appointed length, is inserted into an optical fiber insertion hole 2 secured at the ferrule 1 for multiple-core connector.

Figure 1B:
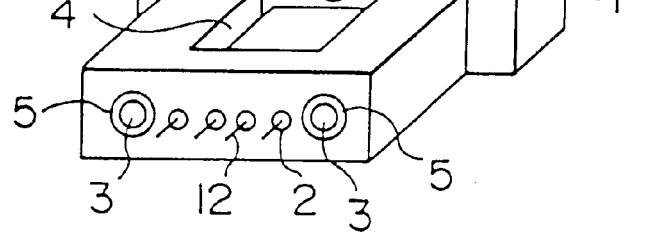

(2) Next, as shown in FIG. 1(b), an adhesive agent 7 is supplied to be flush with the upper surface of an adhesive agent supplying port 4 through an adhesive agent supplying port 4 secured at the ferrule 1 for multiple-core optical connector.

(3) The adhesive agent 7 is hardened.

Figure 1C:
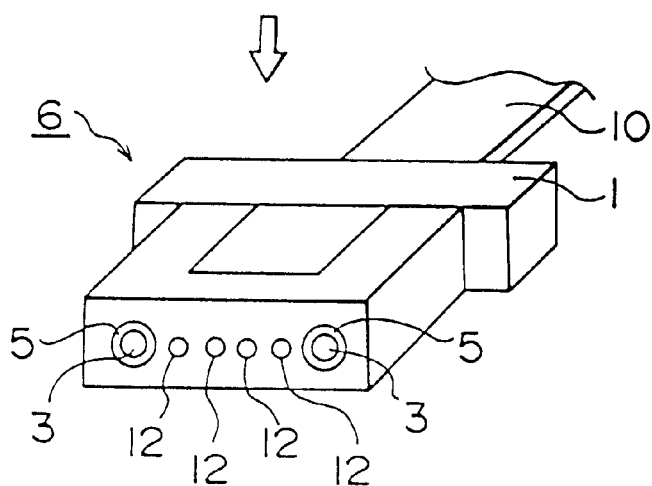

(4) The end face of the ferrule 1 for multiple-core optical connector on which the optical fiber 12 is fixed is (i) ground, (ii) roughly polished, (iii) finish-polished, and (iv) buffed, thereby forming a multiple-core optical connector 6 shown in FIG. 1c). When the abovementioned polishing of the end face is carried out, the ferrule 1 for multiple-core optical connector is in a state where the part of plastic resin, and end faces of the optical fiber 12 and sleeve 5 are polished to be flush, in the processes (i), (ii) and (iii).

Figure 2:
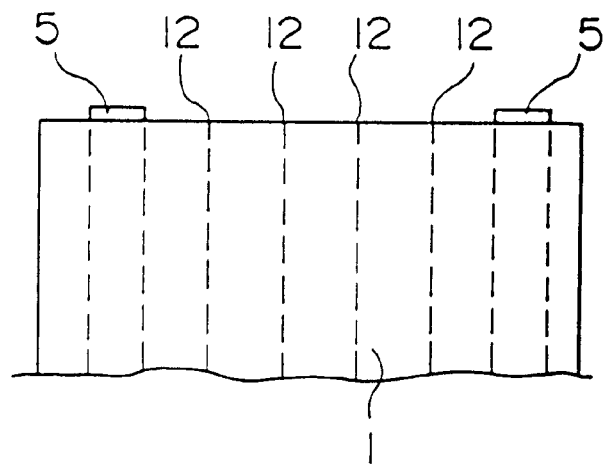
FIG. 2 is a partial plan view showing the end faces of a multiple-core optical connector shown in FIG. 1.

The abrading quantity at the part of plastic resin is made largest as shown in FIG. 2, by using free abrasive grains in (iv) buffing. Subsequently, the optical fibers 12 and sleeve 5 are ground in this order.

Herein, free abrasive grains are such that $CeO_2$ powder is mixed with water. By using the free abrasive grains, minute damages produced by the finish polishing can be eliminated.

In detail, 4-core optical fiber line 10 is fixed to a ferrule for multiple-core optical connector having a zirconium made sleeve 5 and is polished with $CeO_2$ powder free abrasive grains, the grain diameter of which is 2.6 $\mu$m or so, for about three minutes. The connection end face of the multiple-core optical connector is ground to the state where the end face of the sleeve 5 is caused to protrude 0.5 $\mu$m or so from the end face of the ferrule 1 for multiple-core optical connector and the end face of the optical fibers 12 is caused to be flush or protrude up to 0.2 $\mu$m.

As a matter of course, it may be acceptable that the end face of the optical fibers 12 is at a position retracted from the end face of the sleeve 5. It is not necessary for the end face of the optical fibers 12 to protrude from the end face of the ferrule 1 for multiple-core optical connector.

Figure 3:
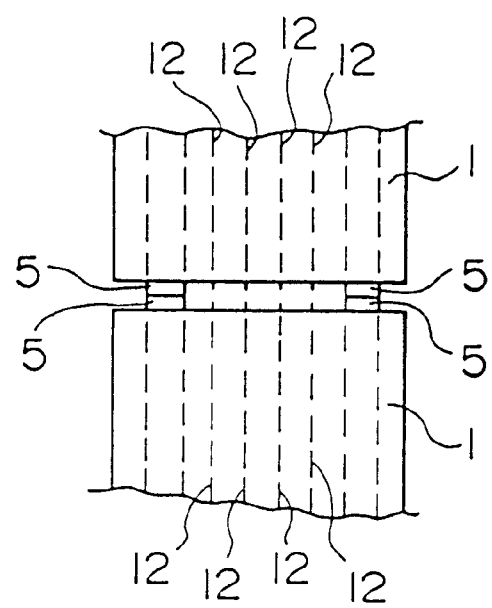
FIG. 3 is a partial plan view showing a connection of multiple-core optical connectors shown in FIG. 1, and FIGS. 4a and 4b are perspective views showing a part of a process of one forming method of a conventional optical connector.
Figure 4A:
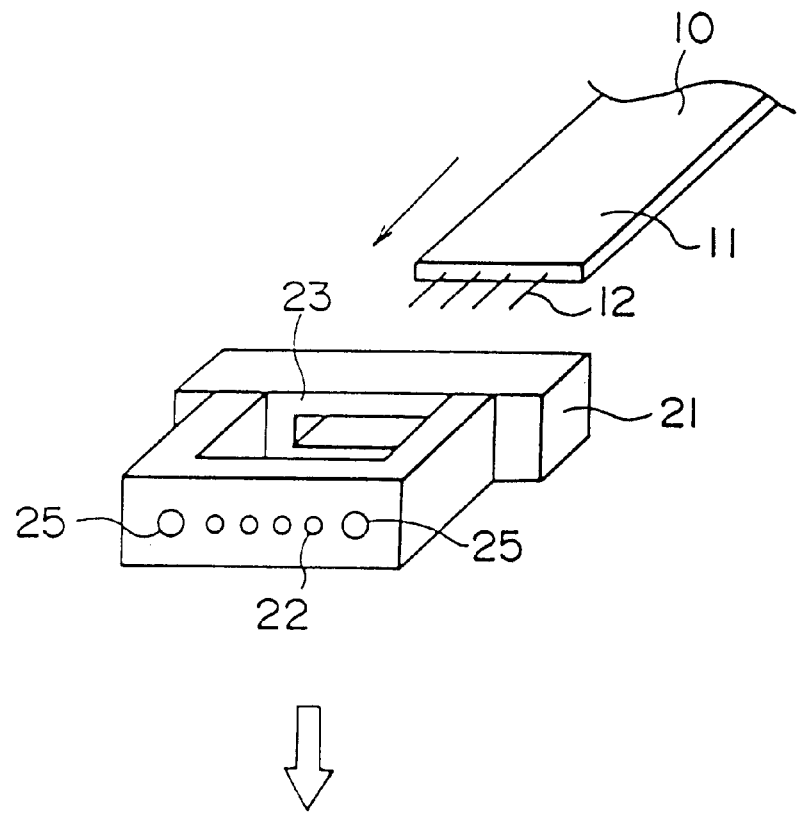
Figure 4B:
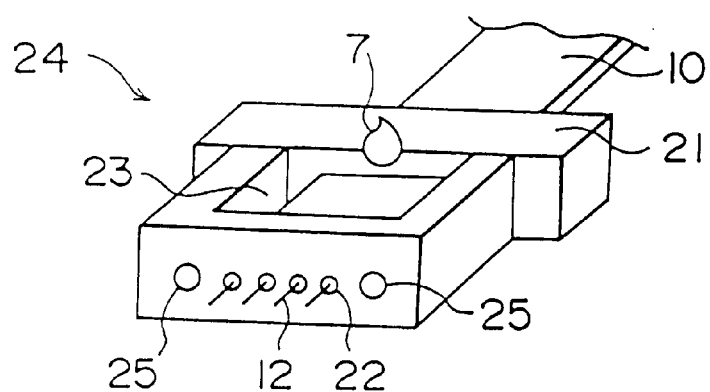

In a case where multiple-core optical connectors 6 kept in the abovementioned state are butted to and connected to each other, as shown in FIG. 3, the end faces of the sleeve 5, which most protrude, are firstly butted to each other. Therefore, the end faces of optical fibers 12, which have less protrusion than them, are not directly brought into contact with each other. Accordingly, even though the multiple-core optical connectors 6 are repeatedly attached to or detached from each other, the end faces of optical fibers 12 are not damaged at all.

Furthermore, since matching oil, the refraction power of which is almost the same as that of the core of optical fibers, is filled between the end faces of connect-ion of multiple-core optical connectors 6, no connection loss is produced even though the end faces of optical fibers 12 are not directly brought into contact with each other.

Still furthermore, judging from the results of experiments, it is most preferable that the protrusion of the sleeve 5 from the end face of the ferrule 1 for multiple-core connector is 0.3 to 0.5 $\mu$m. If the protrusion is greater than 0.5 $\mu$m or so, the connection of optical fibers 12 at their end faces will be made unstable, and if the protrusion is smaller than 0.3 $\mu$m, such a possibility where the end faces of optical fibers 12 are directly brought into collision with each other may be increased.

INDUSTRIAL UTILIZATION

As described above, a multiple-core optical connector according to the invention is preferably used as a connector which is able to collectively connect or disconnect a plurality of optical fibers to be used for optical communications and optical circuits by attaching or detaching the same.

What is claimed is:

1. A multiple-core optical connector, in which optical fibers are inserted into a plurality of optical fiber insertion holes and fixed with an adhesive agent, having a ferrule which includes said plurality of optical fiber insertion holes and fitting pin holes for axial alignment of said optical fiber insertion holes having an appointed interval from said plurality of optical fiber insertion holes and made of plastic resin, wherein said fitting pin holes for axial alignment are formed of a sleeve hole of a sleeve secured at the formed position of fitting pin holes for axial alignment of said ferrule, said sleeve being constructed of a material, the hardness of which is greater than that of said plastic resin and optical fibers, and the end face of said sleeve is protruding from the end face of optical fibers at a connection end face of multiple-core optical connector.

2. A multiple-core optical connector as set forth in claim 1, wherein said sleeve is formed of ceramic or super-hard alloy.

3. A method for manufacturing a multiple-core optical connector comprising of steps of:

preparing in advance a ferrule having a plurality of optical fiber insertion-holes, a sleeve, the hardness of which is higher than that of optical fibers, secured at the formed position of fitting pin for axial alignment, said optical fiber insertion holes and sleeve holes being opened at the end face for connection, and made of plastic resin, wherein said sleeve holes are fitting pin holes for axial alignment, inserting optical fibers into the respective optical fiber insertion holes of the multiple-core optical connector, fixing the optical fibers in optical fiber insertion holes with an adhesive agent, thereafter carrying out a process for grinding the connection end face of a ferrule for multiple-core optical connector along with the end faces of optical fibers and sleeve, wherein the final finishing is performed by buffing with free abrasive grains, and causing said sleeve to protrude from the optical fibers at the connection end face of the ferrule for multiple-core optical connector by utilizing a feature that the buffing quantity of the sleeve, the hardness of which is higher than that of optical fibers and said plastic resin, is made less than the buffing quantity of said optical fibers and plastic resin.

4. A multiple-core optical connector for substantially preventing the end faces of optical fibers from damage during normal use, comprising:

optical fibers inserted into optical fiber insertion holes of a ferrule of the multiple-core connector, having a plurality of optical fiber insertion holes and made of plastic resin, the fibers being fixed within the insertion holes with an adhesive agent; and fitting pin holes for axial alignment constructed of a hole for sleeves made of a material, the hardness of which is greater than that of the plastic resin and optical fibers; and wherein the connection end faces of the ferrule are finished by buffing by using free abrasive grains, the end face of the sleeves having a greater hardness by being ground less than the optical fibers, the end face of the sleeve being formed to protrude from the connection end face of the optical fibers.

* * * * *